United States Patent
Bauer et al.

(10) Patent No.: US 6,366,594 B1
(45) Date of Patent: Apr. 2, 2002

(54) WAVELENGTH SELECTIVE LASER SYSTEM AND ASSOCIATED METHOD

(75) Inventors: Arthur Henry Bauer, Newbury Park; Alan Zachary Ullman, Northridge, both of CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/407,140

(22) Filed: Sep. 28, 1999

(51) Int. Cl.[7] .......................... H01S 3/098; H01S 3/00; H01S 3/095; H01S 3/08
(52) U.S. Cl. .............................. 372/37; 372/19; 372/89; 372/99
(58) Field of Search ............................ 372/37, 89, 99, 372/19

(56) References Cited

U.S. PATENT DOCUMENTS

| | | |
|---|---|---|
| 4,755,999 A | 7/1988 | Macken |
| 5,048,030 A * | 9/1991 | Hiiro ............................ 372/68 |
| 5,095,486 A | 3/1992 | Etievant |
| 5,199,041 A | 3/1993 | Schmiedberger et al. |
| 5,390,203 A | 2/1995 | Miller |
| 5,471,489 A | 11/1995 | Thorland |
| 5,715,269 A | 2/1998 | Shinji |
| 5,790,573 A | 8/1998 | Heller |
| 5,907,573 A | 5/1999 | Ullman et al. |

\* cited by examiner

*Primary Examiner*—Frank G. Font
*Assistant Examiner*—Armando Rodriguez
(74) *Attorney, Agent, or Firm*—Alston & Bird LLP

(57) ABSTRACT

A wavelength selective laser system and associated method are provided that produce laser beams having wavelengths that are only slightly different, but that permit a composite return signal to be selectively processed in accordance with the wavelengths of the signals that comprise the composite return signal. The wavelength selective laser system includes first and second lasers for producing respective laser beams. Each of the first and second lasers define a nominal gain spectrum. However, the wavelength selective laser system also includes a magnetic field generator disposed about the second laser for altering the gain spectrum of the second laser such that the wavelengths of the laser beams produced by the first and second lasers differ by at least one part per million. As such, the first laser will emit signals having a first wavelength and the second laser will emit signals having a second wavelength. The wavelength selective laser system also includes means for directing a composite return signal to the second laser. As a result of the altered gain spectrum of the second laser, the second laser will preferentially amplify the signals of the composite return signal that were originally emitted by the second laser relative to the signals of the composite return signal that were originally emitted by the first laser, even in instances in which the wavelengths differ by only one or several parts per million.

17 Claims, 2 Drawing Sheets

WAVELENGTH SELECTIVE LASER SYSTEM AND ASSOCIATED METHOD

FIELD OF THE INVENTION

The present invention relates generally to laser systems and methods that include laser beams of two different wavelengths and, more particularly, to laser systems and methods that separate a composite return signal based upon the respective wavelengths of the signals that form the composite return signal such that signals having different wavelengths can be separately processed.

BACKGROUND OF THE INVENTION

A number of different applications, such as imaging or laser tracking applications, require the use of multiple laser beams. As such, these laser systems generally include two or more lasers, each of which typically emits a laser beam having a different wavelength than the wavelengths of the laser beams emitted by the other lasers. In addition to generating multiple laser beams having different wavelengths, these laser systems can also receive composite return signals that are likewise comprised of signals having different wavelengths. For example, the composite return signal may be a reflection from an object. As such, by appropriately processing the composite return signal, an image of the object can be obtained at one of the laser wavelengths.

In order to appropriately process the composite return signal, the signals having different wavelengths are typically separated. For example, to generate a proper image of an object, the signals having a particular wavelength are preferably separated from signals having other wavelengths and then analyzed. Generally, a composite signal having signals of different wavelengths is separated according to wavelength by means of wavelength selective optical filters and gratings. In this regard, the wavelength selective optical filters and gratings readily separate the composite return signal according to wavelength if the wavelengths of the signals are quite different. As the difference between the wavelengths of the signals become smaller, however, optical filters and gratings are no longer able to effectively separate the signals.

This limitation is a sizable problem since a number of applications, such as imaging applications, that utilize multiple laser sources for emitting laser beams of different wavelengths prefer that the signals differ in wavelength by only a small amount. For example, the precision imaging and targeting of targets for laser weapons requires that the wavelength of the laser beam emitted by the imaging laser be nearly the same as the wavelength of the laser beam emitted by the high energy laser (HEL) weapon to minimize the targeting error. In this regard, any differences in the wavelengths between the signals emitted by the imaging laser and the HEL can create a somewhat inaccurate or displaced image of the target with respect to the aimpoint of the HEL on target. These effects are principally due to chromatic aberrations and other differences in the atmospheric transmission of the laser beams of different wavelengths. As such, the image of the target created from the reflected signals that originated with the imaging laser may be different than and displaced from the image of the target created from the reflected signals that originated with the HEL due to differences in the atmospheric transmission, including the chromatic aberration, of the signals having different wavelengths.

For example, in instances in which the imaging laser or illuminator is a neodymium-doped yttrium aluminum garnet (Nd:YAG) laser that emits a laser beam having a wavelength of 1.06 microns and the HEL is a chemical oxygen iodine laser (COIL) device emitting a laser beam having a wavelength of 1.315 microns, the composite return signal reflected from a target can be readily separated by conventional optical filters. However, the resulting image created from the reflected laser signals having a wavelength of 1.06 microns will differ somewhat in location from the image or aimpoint of the target for the laser beam emitted by the HEL since the effects of the atmospheric transmission of the laser beam having a wavelength of 1.06 microns are significantly different than the effects of the atmospheric transmission of a laser beam having a wavelength of 1.315 microns. As such, some difficulty may arise in precisely locating and maintaining the target aimpoint due to the inaccuracies with the target image location.

In order to create more precisely aligned images, the laser beams emitted by the plurality of laser sources preferably have wavelengths that differ only slightly, such as by one or only several parts per million. However, a composite return signal comprised of signals that differ only slightly in wavelength cannot be easily separated by conventional optical filters or gratings. As such, a need exists for laser systems and associated methods that emit laser beams of slightly different wavelengths and that reliably separate the composite return signal based upon the wavelength of the signals, even in instances in which the wavelengths differ by only one or a few parts per million.

SUMMARY OF THE INVENTION

A wavelength selective laser system and associated method are therefore provided that produce laser beams having wavelengths that are only slightly different, but that permit a composite return signal to be selectively processed in accordance with the wavelengths of the signals that comprise the composite return signal. In this regard, the wavelength selective laser system and method of the present invention can process the composite return signal such that the signals having one particular wavelength are preferentially amplified relative to signals having other wavelengths. As such, the wavelength selective laser system and method of the present invention need not rely upon optical filters or gratings in order to separate the composite return signal based upon the wavelengths of the signals that form the composite return signal.

In one embodiment, the wavelength selective laser system includes first and second lasers for producing respective laser beams. Each of the first and second lasers define a nominal gain spectrum. In one advantageous embodiment, the first and second lasers are the same type of laser, such as a chemical oxygen iodine laser, so as to have the same nominal gain spectrum. However, the wavelength selective laser system also includes a magnetic field generator disposed about at least one of the lasers for altering the gain spectrum of the laser such that the wavelengths of the laser beams produced by the first and second lasers differ by a small amount, typically on the order of one or several parts per million, so that their gain spectra do not coincide. This shift in wavelength comes about due to the effect of the imposed magnetic field on the energy levels of the lasing species. As such, the first laser will emit signals having a first wavelength and the second laser will emit signals having a second wavelength. In one embodiment, the magnetic field generator includes at least one electromagnet extending around a laser cavity of one of the lasers to thereby generate a substantially uniform magnetic field within the laser cavity. While the magnetic field generator can be disposed about either laser, the magnetic field generator of one embodiment is disposed about the second laser so as to alter the gain spectrum of the second laser such that little, if any, gain is provided by the second laser for those signals produced by the first laser according to the nominal gain spectrum.

The wavelength selective laser system also includes means for directing a composite return signal to the second laser. For example, the composite return signal may be a reflection of the laser beams emitted by the first and second lasers from a target or other object. As such, the composite return signal includes signals having both the first and second wavelengths. As a result of the altered gain spectrum of the second laser, the second laser will preferentially amplify the signals having the second wavelength relative to signals having the first wavelength. In other words, the second laser will preferentially amplify the signals of the composite return signal that were originally emitted by the second laser relative to the signals of the composite return signal that were originally emitted by the first laser.

The wavelength selective laser system can also include a signal processing system for receiving and processing an output signal from the second laser which is based almost entirely on signals that were originally emitted by the second laser. In one embodiment, the signal processing system is an imaging system for constructing an image based upon the preferentially amplified signals having the second wavelength. Although the wavelength selective laser system can be utilized for a variety of applications, the wavelength selective laser system and method can be advantageously employed to image targets for laser weapons, in which instance the first laser is a high energy laser and the second laser is an illuminator.

The second laser therefore serves as both a wavelength-selective amplifier and a resonator. In this regard, the second laser includes a laser cavity about which a magnetic field generator is disposed for alterating the nominal gain spectrum of the laser cavity. According to one embodiment, the second laser can also include a first set of reflective elements disposed on opposite sides of the laser cavity for reflecting a signal through the laser cavity in order to amplify the signal according to the altered gain spectrum of the laser cavity. As such, the first set of reflective elements define the resonator cavity section-of the second laser that serves to emit a laser beam of the predetermined wavelength. According to the present invention, the second laser can also include a second set of reflective elements disposed on opposite sides of the laser cavity for reflecting a return signal through the laser cavity. As described above, the return signal is generally a composite signal including signals that were originally generated by the second laser as well as signals that were originally generated by another laser having a slightly different wavelength. As a result of the altered gain spectrum of the laser cavity, the laser cavity serves to preferentially amplify portions of the return signal and, more particularly, those portions of the return signal that have the same wavelength as the signals originally emitted by the laser cavity. As such, the second set of reflective elements define an amplification section. The preferentially amplified signals can then be provided to a signal processing system, such as for creating an image based upon the preferentially amplified signals.

The first and second sets of reflective elements define different paths through the laser cavity. In this regard, the laser cavity typically extends in a longitudinal direction. As such, the first and second sets of reflective elements are preferably disposed about different, longitudinally displaced portions of the laser cavity. As such, the laser cavity defines both a resonator section and an amplification section.

By processing a composite return signal having signals with both first and second wavelengths by preferentially amplifying the signals having the second wavelength relative to the signals having the first wavelength, the wavelength selective laser system and method of the present invention is capable of separating the return signals having the second wavelength from return signals having the first wavelength, even in instances in which the wavelengths differ by no more than 1 part per million. As such, a target or other object can be illuminated by a pair of laser beams having wavelengths that are very nearly equal and the composite return signals can be appropriately processed so as to separate those signals that are due to reflections of the first beam from those signals that are due to reflections of the second beam. By illuminating the target or other object with first and second beams having similar wavelengths, chromatic aberrations and other differences that might arise in the atmospheric transmission of laser beams having different wavelengths are significantly reduced and the image constructed based upon the portion of the composite return signal that is due to the reflection of the second laser beam also provides an accurate representation of the target or other object for signals having the first wavelength.

DETAILED DESCRIPTION OF THE PREFERRED EMBODIMENT

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
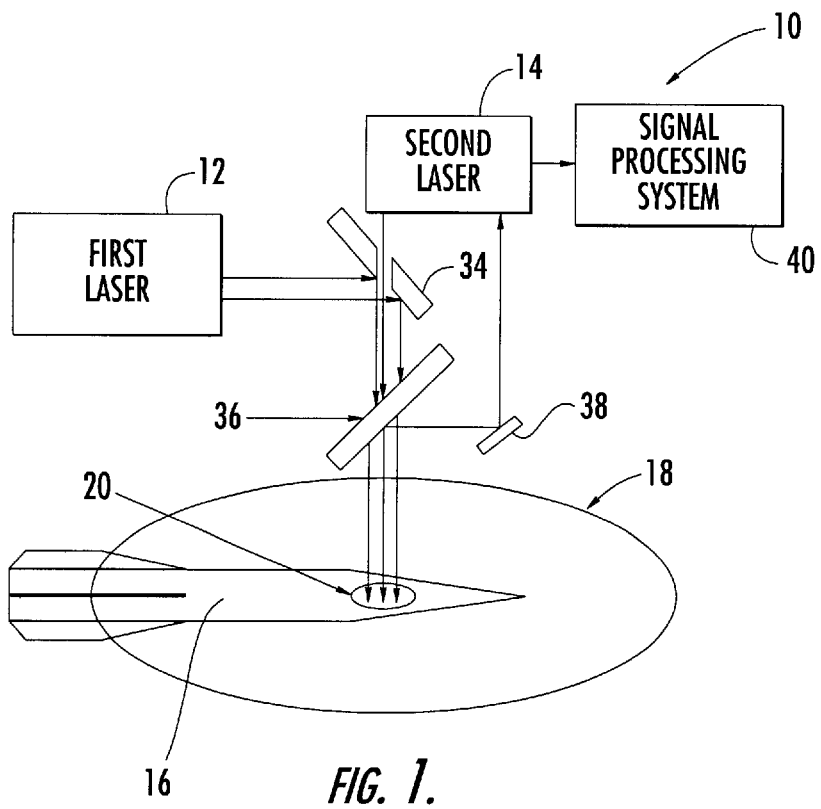
FIG. 1 is a schematic diagram illustrating a wavelength selective laser system according to one embodiment of the present invention.

Referring now to FIG. 1, a wavelength selective laser system 10 according to one advantageous embodiment is depicted. As shown, the wavelength selective laser system includes first and second lasers 12, 14 that each produce respective laser beams. Although the first and second lasers can be selected from among many different types of lasers, the first and second lasers can advantageously be the same type of laser such that each laser has the same nominal gain spectrum. For example, the first and second lasers can both be chemical oxygen iodine lasers (COILs).

The wavelength selective laser system 10 and method of the present invention can be employed in a variety of applications. However, the wavelength selective laser system and method of the present invention is particularly advantageous for applications in which a target or other object 16 is to be illuminated by each of two different laser beams and an image of the target or other object is to be constructed based upon the return signals attributable to one of the laser beams. The wavelength selective laser system and method are particularly useful for this application since the composite return signal having signals with both the first and second wavelengths can be reliably separated such that an accurate image can be constructed from signals having one of the wavelengths, even in instances in which the first and second wavelengths differ by no more than one or several parts per million. As such, the wavelength selective laser system and method of the present invention permit the target or other object to be illuminated with first and second laser beams having very nearly the same wavelength, i.e., differing by only one or several parts per million, such that the resulting image that is constructed based upon return signals attributable to one of the laser beams also provides an accurate image of the target or other object for the other laser beam and is not distorted or otherwise altered by chromatic aberration or other differences in the atmospheric transmissions of the first and second laser beams.

In one advantageous embodiment, the first laser 12 is a high energy laser (HEL) and the second laser 14 is an illuminator. In this regard, both the HEL and the illuminator can be COIL devices, although the HEL has significantly more power than the illuminator as a result of the HEL having a larger laser cavity with more gas flow than the illuminator. As shown in FIG. 1, both the HEL and the illuminator can illuminate a target or other object 16. Typically, the illuminator is designed to interrogate a relatively large area of the target and to have a relatively short coherence length so that a clear image of the target can be generated based upon the return signals attributable to the laser beam generated by the illuminator. In contrast, the laser beam emitted by the HEL is narrowly focused and may have a longer coherence length. With reference to FIG. 1, the broader and narrower focus of the laser beams generated by the illuminator and the HEL are depicted by the larger and smaller circles 18, 20, respectively.

Figure 2:
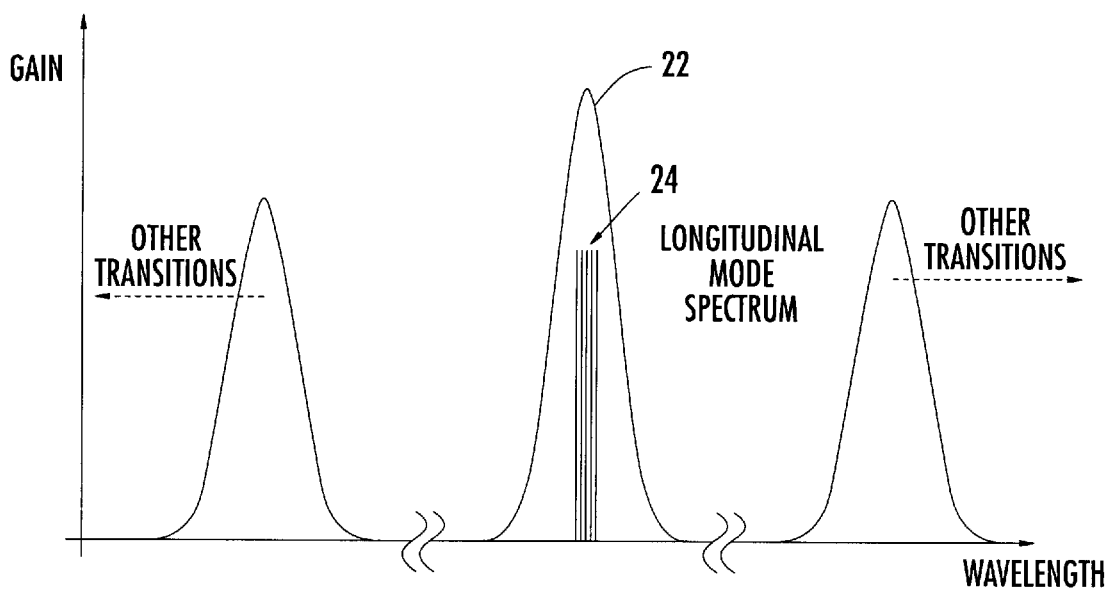
FIG. 2 is a graph illustrating the gain spectrum of a narrow-line laser, such as a chemical oxygen iodine laser.

While the wavelength selective laser system 10 can include various types of first and second lasers 12, 14, the first and second lasers are typically a narrow-line laser, such as a COIL device. In this regard, the nominal gain spectrum of a COIL device is depicted in FIG. 2. As shown, the gain spectrum includes several gain lines with one gain line 22 having the largest gain and therefore dominating the lasing process. As also shown in FIG. 2, the lasing occurs in one or more longitudinal modes separated by a relatively small wavelength. These modes are collectively termed the longitudinal mode spectrum and are depicted by a plurality of closely spaced parallel lines 24 in FIG. 2.

Figure 3:
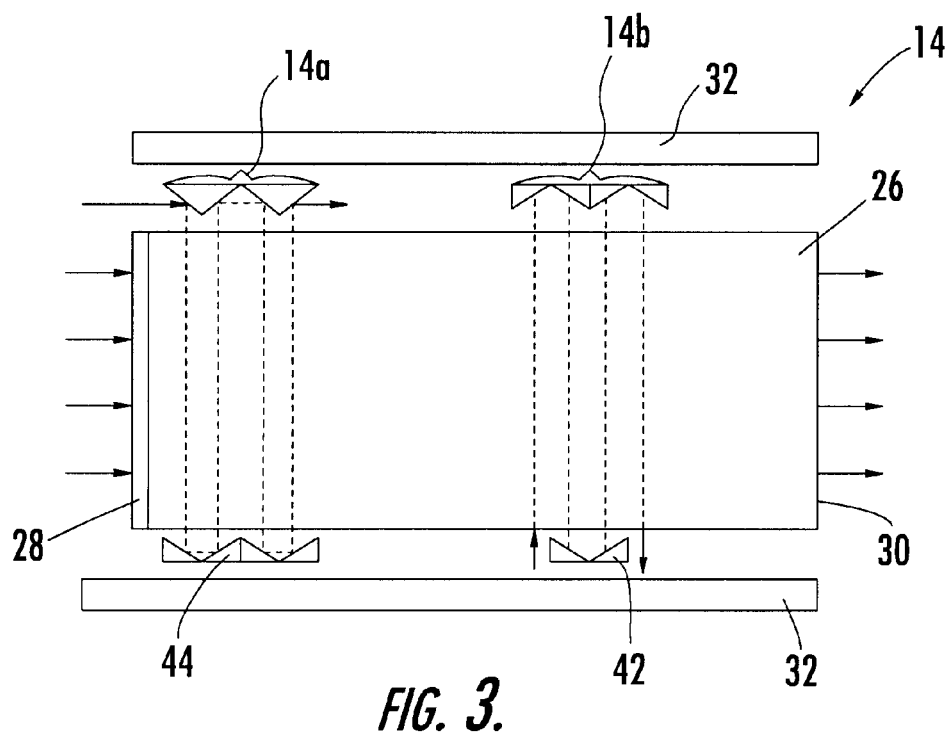
FIG. 3 depicts a laser amplifier and resonator according to one advantageous embodiment of the present invention that includes a magnetic field generator disposed about the laser cavity for altering the gain spectrum of the laser cavity.

According to the present invention, the gain spectrum of the second laser 14 is altered such that the gain spectra of the first and second lasers do not coincide. Thus, although the second laser may be the same type of laser as the first laser 12 and may therefore have the same nominal gain spectrum, such as shown in FIG. 2 for a COIL device, the gain spectrum of the second laser is altered relative to the nominal gain spectrum and, thus, relative to the gain spectrum of the first laser. In this regard, the second laser of one advantageous embodiment is depicted in FIG. 3 in which the second laser serves as both the laser amplifier and resonator as described hereinbelow. Although the second laser can be any of a variety of different types of lasers, the second laser of one advantageous embodiment is a COIL device having a laser cavity 26 through which a lasing medium containing the species $O_2(^1\Delta)$ (electronically-excited oxygen) and I* (electronically-excited iodine atoms) flows as known to those skilled in the art. As shown, the laser cavity typically includes an upstream end defined by a nozzle 28 though which lasing medium enters the laser cavity and a downstream end 30 through which lasing medium exits the laser cavity after extraction of some of the medium energy in the form of the laser beam. According to the present invention, the laser amplifier and resonator also includes a magnetic field generator 32 disposed about the laser cavity for altering the gain spectrum of the laser cavity. Although a variety of magnetic field generators can be employed, the magnetic field generator preferably generates a substantially uniform magnetic field for all points within the laser cavity. In one embodiment, the magnetic field generator includes at least one electromagnet extending around the laser cavity and closely spaced thereto. Although the magnetic field generator can generate a magnetic field of different magnitudes, the magnetic field typically has a magnitude of 1–20 kilogauss and, most commonly, approximately 3 kilogauss. In addition, the magnetic field is preferably oriented normal or orthogonal to the flow of the lasing medium through the laser cavity.

The magnetic field has two primary effects on the gain spectrum of the second laser 14 based upon the effect of the magnetic field on the quantum state of the lasing species. As shown by the altered gain spectrum of FIG. 4, the magnetic field serves to split each of the gain lines, such as each of the gain lines depicted in FIG. 2, into a plurality or spectrum of gain lines. In addition, the magnetic field serves to shift the dominant gain lines and hence the longitudinal lasing modes to a somewhat different wavelength. As a result, the laser beam emitted by the second laser will have a slightly different wavelength than the laser beam emitted by the first laser even though the first and second lasers are of the same type and have the same nominal gain spectrum. By appropriately modifying the magnitude of the magnetic field, the altered gain spectrum of the second laser and, therefore, the wavelength of the photons emitted by the second laser can be varied somewhat in order to obtain a desired wavelength differential with respect to the signals emitted by the first laser. Typically, the first and second lasers are configured such that the laser beams emitted by the first and second lasers differ by one or only several parts per million.

As a result of splitting the gain lines and shifting the dominant gain lines, the altered gain spectrum can be configured such that the gain provided by the laser cavity 26 of the second laser 14 is minimal, at the wavelengths of the longitudinal mode spectrum of the nominal gain spectrum, such as depicted by the plurality of closely spaced parallel lines in FIG. 2. For purposes of illustration, the lines representing the longitudinal mode spectrum of the nominal gain spectrum of FIG. 2 are superimposed upon the altered gain spectrum of FIG. 4 to illustrate the minimal, if any, gain provided therefore. As described above, the strength of the magnetic field can be adjusted in order to correspondingly vary the altered gain spectrum. As such, the magnetic field generator 32 can be tuned such that the amplification provided by the laser cavity of the second laser according to the altered gain spectrum is minimized for signals within the longitudinal mode spectrum of the nominal gain spectrum.

As such, the laser beams emitted by the first and second lasers 12, 14 can both illuminate the same target or other object 16 with the laser beam generated by the first laser being generated according to the nominal gain spectrum and the laser beam generated by the second laser being generated according to the altered gain spectrum. In this regard, the wavelength selective laser system 10 can include optical elements, such as mirrors 34, for combining the first and second laser beams into a single polarized beam. As a result of the reflection of the laser beams from the target or other object, a composite return signal is produced. The composite return signal is a nonpolarized signal that includes reflected signals having the first wavelength that were originally produced by the first laser and reflected signals having the second wavelength that were originally produced by the second laser. In order to substantially reduce chromatic aberrations and other differences in the atmospheric transmission of signals of different wavelengths, the first and second wavelengths differ only slightly, such as one or several parts per million. As such, those portions of the composite return signal that have the first and second wavelengths cannot readily be separated by conventional optical gratings and filters.

Figure 4:
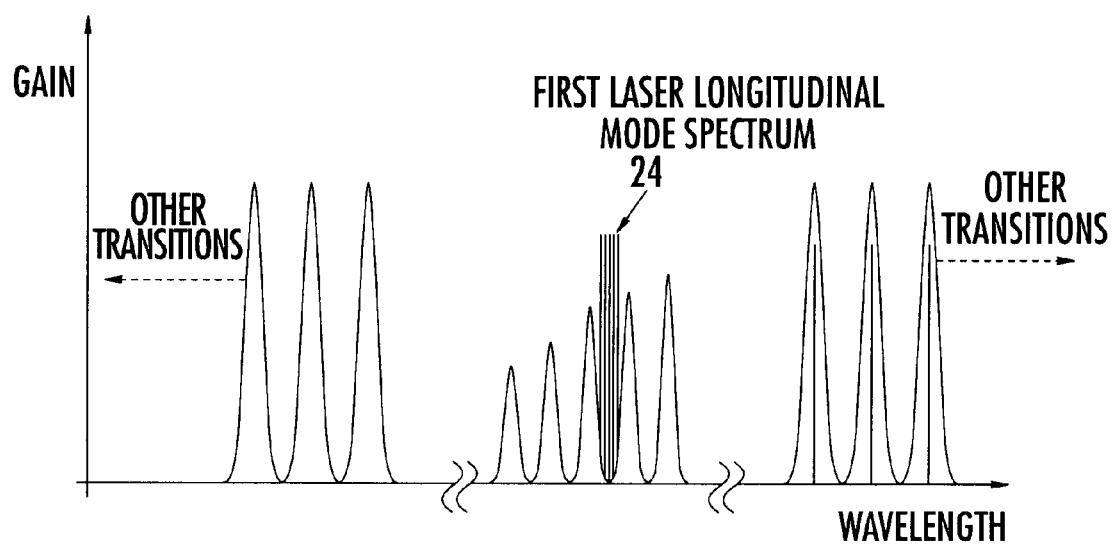
FIG. 4 is the altered gain spectrum of a laser amplifier and resonator according to one embodiment of the present invention in which the gain lines are split and shifted somewhat relative to the gain lines depicted in FIG. 2.

As shown in FIG. 1, the composite return signals are, instead, directed to the laser cavity 26 of the second laser 14. In one embodiment in which the composite return signals are nonpolarized, the composite return signals are directed by a polarization splitter 36 and one or more mirrors 38 or other optical elements which separate outgoing and incoming waves to the laser cavity of the second laser. The second laser then amplifies the composite return signal in accordance with the altered gain spectrum. Since the portion of the composite return signal having the second wavelength was originally generated by the second laser according to the altered gain spectrum, that portion of the composite return signal is greatly amplified. However, since the portion of the composite return signal having the first wavelength was originally generated by the first laser 12 in accordance with the nominal gain spectrum, that portion of the composite return signal is only slightly amplified, if at all. In this regard, the longitudinal modes of the nominal gain spectrum are shown in FIG. 4 to fall between the gain lines of the altered gain spectrum such that signals having the first wavelength in accordance with the longitudinal modes of the first laser are amplified very little, if at all. After passing through the laser cavity of the second laser, the composite return signal has been processed such that the signals having the second wavelength are greatly amplified and, therefore, dominate the output of the second laser relative to the signals having the first wavelength that are amplified only slightly, if at all, as a result of the altered gain spectrum of the second laser.

Following the preferential amplification of the composite return signals by the second laser 14, the output signal of the second laser can be further processed as desired. In this regard, the wavelength selective laser system 10 of FIG. 1 is depicted to include a signal processing system 40. Depending upon the application, the signal processing system can take on many forms. For example, the signal processing system can be an imaging system in order to display and/or store an image of the target or other object 16 illuminated by the laser beams. In this regard, the imaging system will generally include optical elements to focus the output signal from the second laser and an array of sensors, film or the like for recording and/or displaying the resulting image of the target or other object. In particular, the signal processing system may contain a focal plane array, read-out systems, and computer analysis hardware and software to evaluate the target image as received and amplified and to determine the location in the target to which the HEL is to be directed. However, the wavelength selective laser system can include other types of signal processing systems without departing from the spirit and scope of the present invention.

As shown in FIG. 3, the second laser 14 includes both an amplification section 14a and a resonator section 14b. In this regard, in addition to the laser cavity 26 and the magnetic field generator 32 disposed about the laser cavity, the second laser includes first and second sets of reflective elements 42, 44, such as mirrors. As shown in FIG. 3, the first set of reflective elements that defines the resonator section includes elements disposed on opposite sides of the laser cavity for reflecting a signal through the laser cavity in order to amplify the signal according to the altered gain spectrum of the laser cavity. As shown, the signal is preferably reflected multiple times through the laser cavity in order to increase the amplification of the signal. Thus, a signal that is generated within the laser cavity in a manner known to those skilled in the art can be reflected multiple times through the laser cavity prior to being emitted and directed to the target or other object 16 that is to be illuminated. A portion of the laser beam contained within the second laser cavity can be outcoupled and directed to a beam control system which is used to stabilize, direct, and appropriately focus the beam towards the target 16 in a manner also known to those skilled in the art. As such, the first set of reflective elements defines a resonator section.

In addition to the resonator section 14b, the second laser 14 includes a second set of reflective elements 44 that includes elements disposed on opposite sides of the laser cavity 26 for reflecting a return signal, such as the composite return signal from the target or other object 16, through the laser cavity. As described above, the altered gain spectrum created by the magnetic field imposed by the magnetic field generator 32 causes the laser cavity to preferentially amplify that portion of the composite return signal that was originally generated by the second laser while amplifying that portion of the composite return signal that was originally generated by the first laser 12 very little, if at all, since the longitudinal modes of the nominal gain spectrum fall within regions of the altered gain spectrum that have little, if any, amplification. As such, the composite return signals reflect several times through the laser cavity of the second laser such that the portion of the composite return signals attributable to the laser beam originally generated by the second laser, i.e., the signals having the second wavelength, is preferentially amplified. The preferentially amplified composite return signal is then output to the signal processing system 40, such as for creating an image of the target or other object that is illuminated as described above.

As shown in FIG. 3, the first and second sets of reflective elements 42, 44 define different paths through the laser cavity 26. In this regard, the laser cavity typically extends in a longitudinal direction. As such, the first and second sets of reflective elements are preferably disposed about different, longitudinally displaced portions of the laser cavity. As such, the laser cavity defines both a resonator section 14b and an amplification section 14a, as described above. Both sections are contained within the uniform magnetic field 32, however, and therefore have the same displaced gain spectrum. Therefore, light emitted by the resonator section 14b will be efficiently amplified in the amplification section 14a.

By processing a composite return signal having signals with both first and second wavelengths by preferentially amplifying the signals having the second wavelength relative to the signals having the first wavelength, the wavelength selective laser system 10 and method of the present invention is capable of separating the return signals having the second wavelength from signals having the first wavelength, even in instances where the wavelengths differ by no more than 1 part per million. As such, a target or other object 16 can be illuminated by a pair of laser beams having wavelengths that are very nearly equal and the composite return signals can be appropriately processed so as to separate those signals that are due to reflections of the first beam from those signals that are due to reflections of the second beam. By illuminating the target or other object with first and second beams having extremely similar wavelengths, chromatic aberrations and other differences that might arise in the atmospheric transmission of laser beams having different wavelengths are significantly reduced and the image constructed based upon the portion of the composite return signal that is due to the reflection of the second laser beam also provides an accurate representation of the target or other object for signals having the first wavelength.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A wavelength selective laser system comprising:

first and second lasers for producing respective laser beams;

a magnetic field generator disposed about at least one of said first and second lasers for altering a gain spectrum of the at least one laser such that the wavelengths of the laser beams produced by said first and second lasers differ by at least 1 part per million;

means for directing a composite return signal to said second laser, wherein the composite return signal comprises signals having both the first and second wavelengths; and a signal processing system for receiving and processing an output signal from said second laser, wherein the output signal is based upon the composite return signal in which those signals having the second wavelength are preferentially amplified relative to those signals having the first wavelength.

2. A wavelength selective laser system according to claim 1 wherein said magnetic field generator is disposed about said second laser.

3. A wavelength selective laser system according to claim 2 wherein said magnetic field generator alters the gain spectrum of said second laser such that the gain provided by said second laser for signals having the first wavelength is approximately zero.

4. A wavelength selective laser system according to claim 1 wherein said first and second lasers are the same type of lasers having the same nominal gain spectrum.

5. A wavelength selective laser system according to claim 4 wherein said first and second lasers are both chemical oxygen iodine lasers.

6. A wavelength selective laser system according to claim 1 wherein said first laser is a high energy laser, and wherein said second laser is an illuminator.

7. A wavelength selective laser system according to claim 1 wherein said signal processing system comprises an imaging system for constructing an image based upon the preferentially amplified signals having the second wavelength.

8. A laser amplifier and resonator comprising:

a laser cavity;

a magnetic field generator disposed about said laser cavity for altering a gain spectrum of said laser cavity;

a first set of reflective elements disposed on opposite sides of said laser cavity for reflecting a signal through said laser cavity in order to amplify the signal according to the altered gain spectrum of said laser cavity; and a second set of reflective elements disposed on opposite sides of said laser cavity for reflecting a return signal through said laser cavity in order to preferentially amplify portions of the return signal according to the altered gain spectrum of said laser cavity, wherein said second set of reflective elements define a different path through said laser cavity than said first set of reflective elements such that said second set of reflective elements define an amplification section and said first set of reflective elements define a resonator section.

9. A laser amplifier and resonator according to claim 8 wherein said magnetic field generator comprises at least one electromagnet extending around said laser cavity to thereby generate a substantially uniform magnetic field within said laser cavity.

10. A laser amplifier and resonator according to claim 8 wherein said laser cavity is a chemical oxygen iodine laser cavity.

11. A laser amplifier and resonator according to claim 8 wherein said laser cavity extends in a longitudinal direction, and wherein said first and second sets of reflective elements are disposed about different, longitudinally displaced portions of said laser cavity.

12. A method for selectively processing a composite return signal having first and second wavelengths that differ by at least 1 part per million, the method comprising:

providing first and second laser cavities defining respective gain spectrums;

altering the gain spectrum of the second laser cavity;

emitting a first laser beam having the first wavelength from the first laser cavity;

emitting a second laser beam having the second wavelength from the second laser cavity;

directing a composite return signal to the second laser cavity, wherein the composite return signal comprises signals having both the first and second wavelengths; and preferentially amplifying, within the second laser cavity, the signals of the composite return signal having the second wavelength relative to the signals of the composite return signal having the first wavelength.

13. A method according to claim 12 wherein altering the gain spectrum of the second laser cavity comprises applying a magnetic field to the second laser cavity.

14. A method according to claim 12 wherein altering the gain spectrum of the second laser cavity comprises altering the gain spectrum of the second laser cavity such that the gain provided by the second laser cavity for signals having the first wavelength is approximately zero.

15. A method according to claim 12 wherein providing the first and second laser cavities comprises providing first and second laser cavities which are of the same type and which have the same nominal gain spectrum.

16. A method according to claim 15 wherein providing the first and second laser cavities comprises providing first and second chemical oxygen iodine laser cavities.

17. A method according to claim 12 further comprising constructing an image based upon the preferentially amplified signals having the second wavelength.

* * * * *